Feb. 9, 1954  G. C. ELLERBECK  2,668,660
PLURAL TOTALIZER ADDING MACHINE
Original Filed Aug. 12, 1946  12 Sheets-Sheet 1
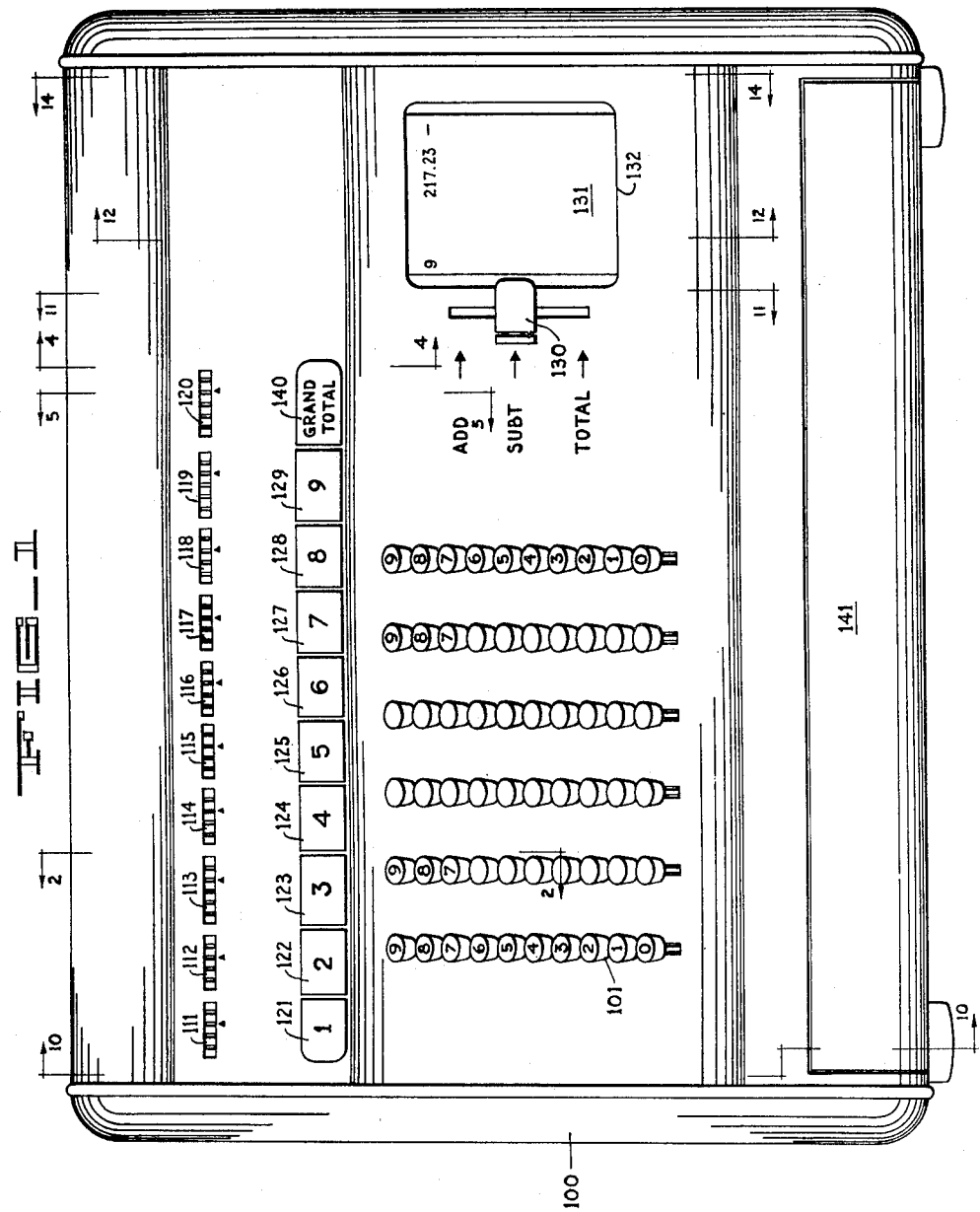
INVENTOR.
GRANT C. ELLERBECK
BY

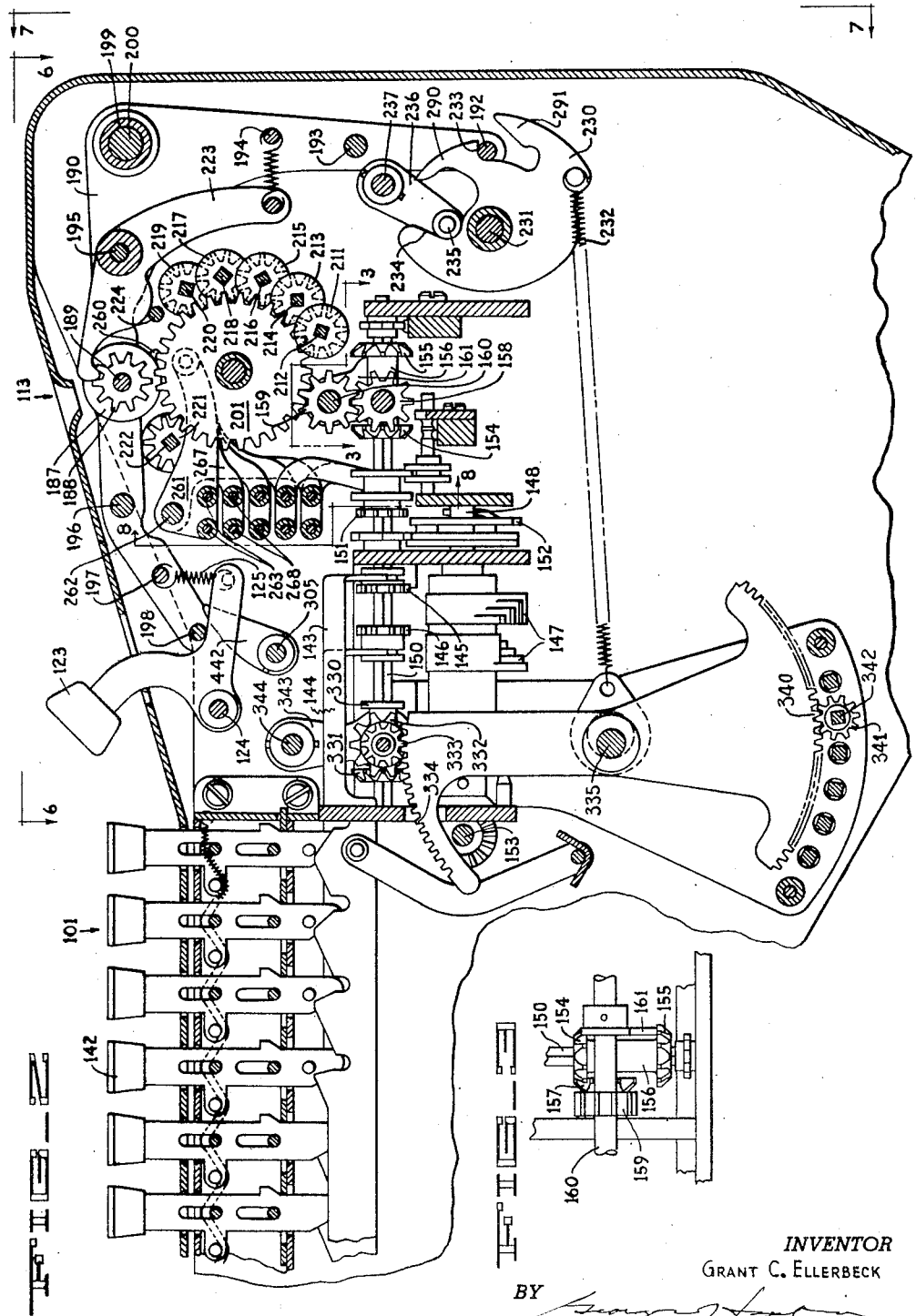
*INVENTOR*
Grant C. Ellerbeck
BY

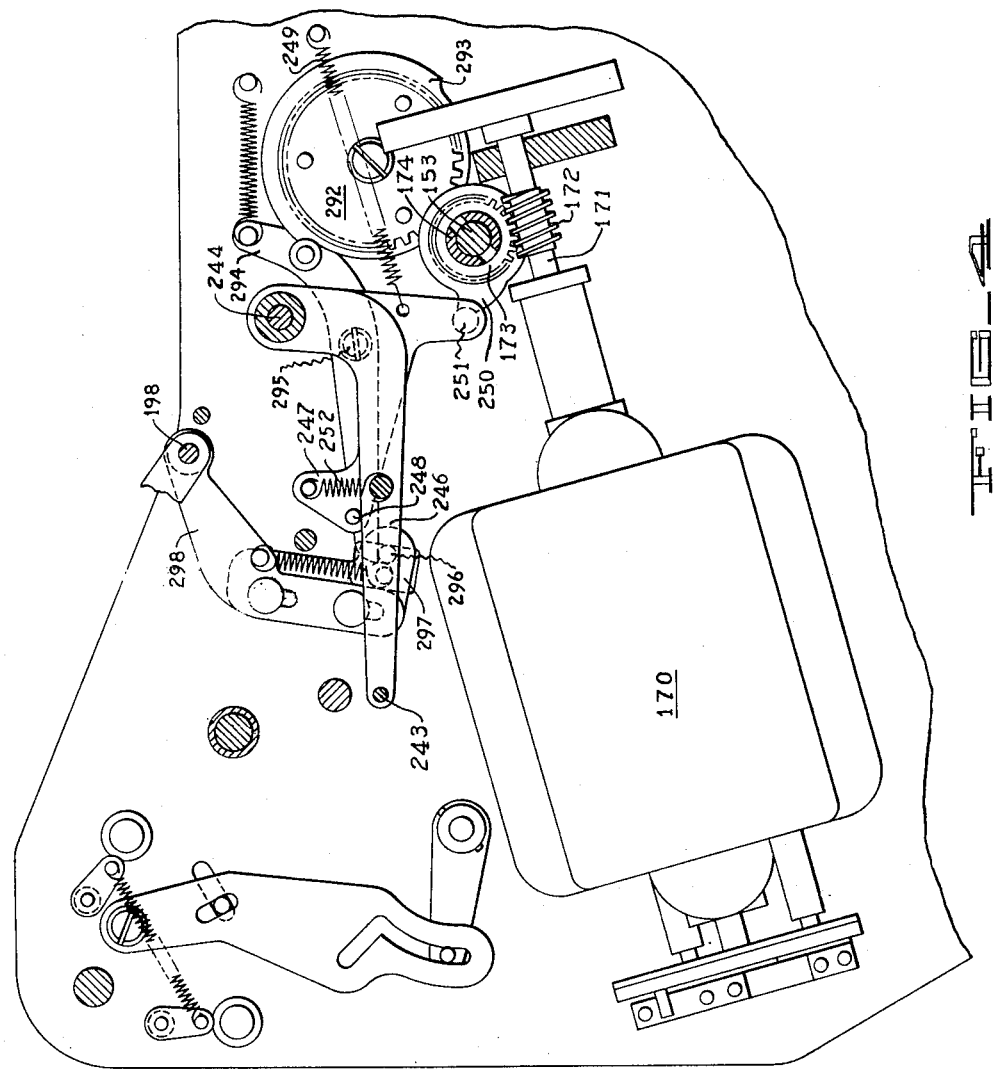

Feb. 9, 1954 G. C. ELLERBECK 2,668,660
PLURAL TOTALIZER ADDING MACHINE
Original Filed Aug. 12, 1946 12 Sheets-Sheet 4
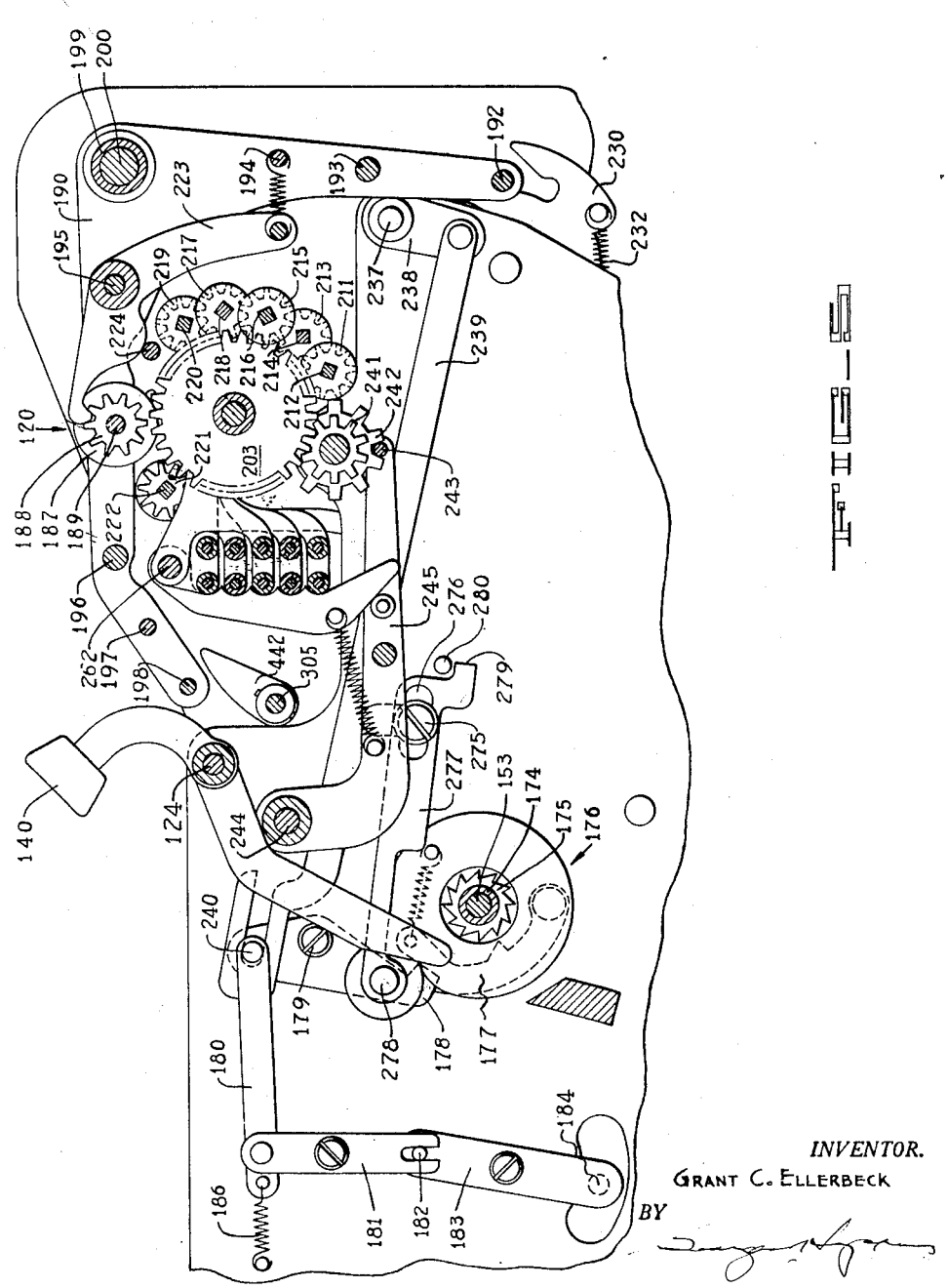
INVENTOR.
GRANT C. ELLERBECK
BY

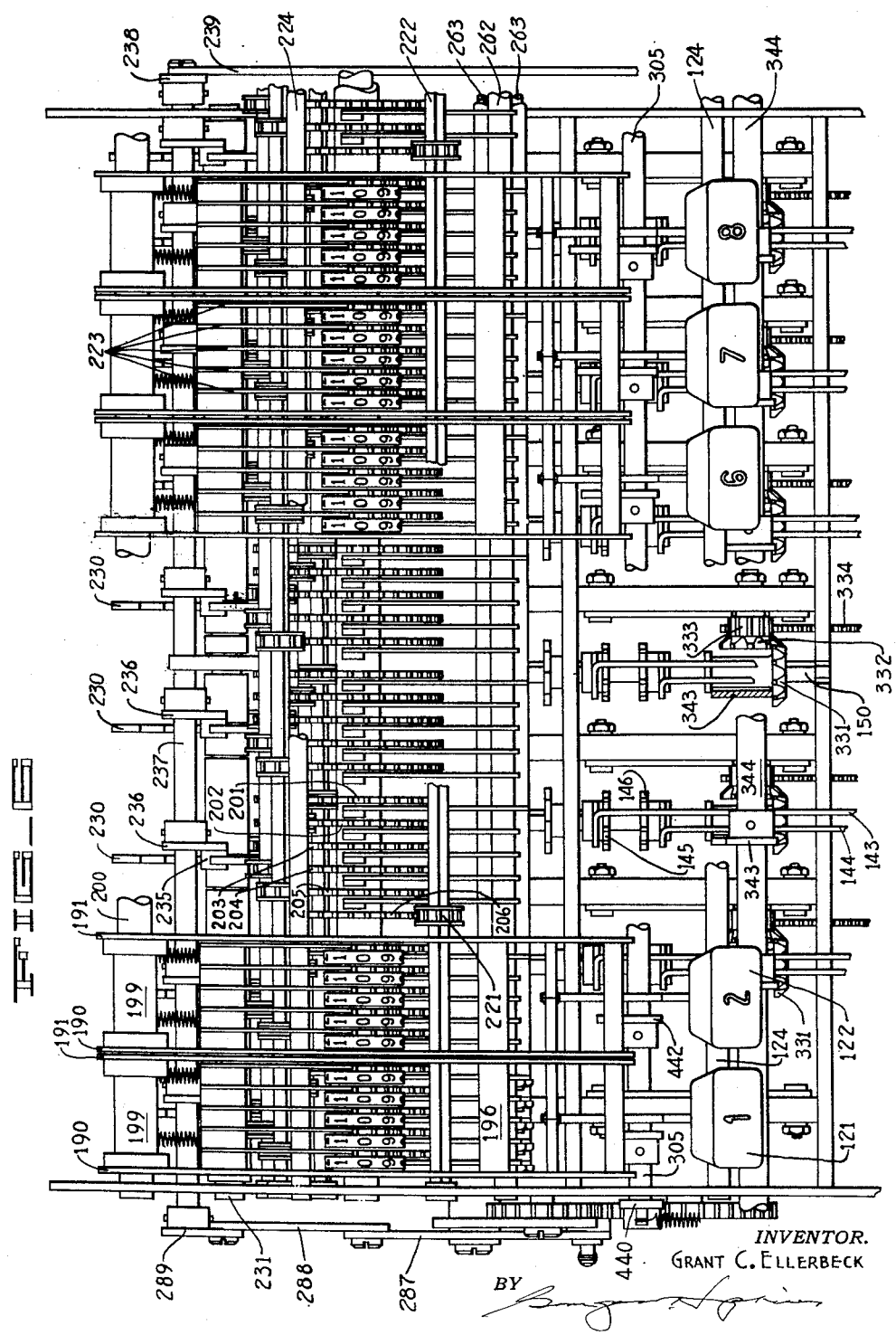

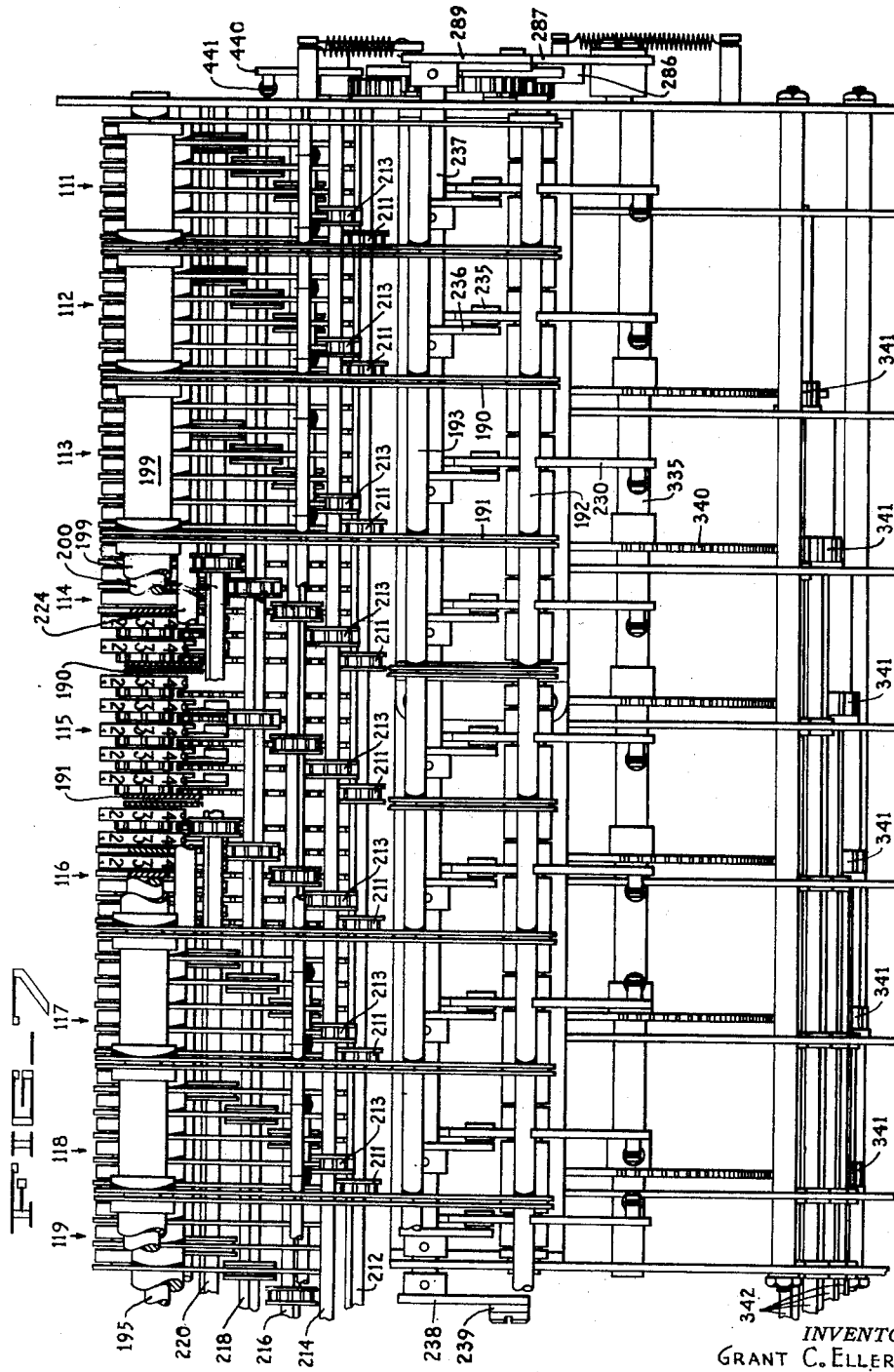

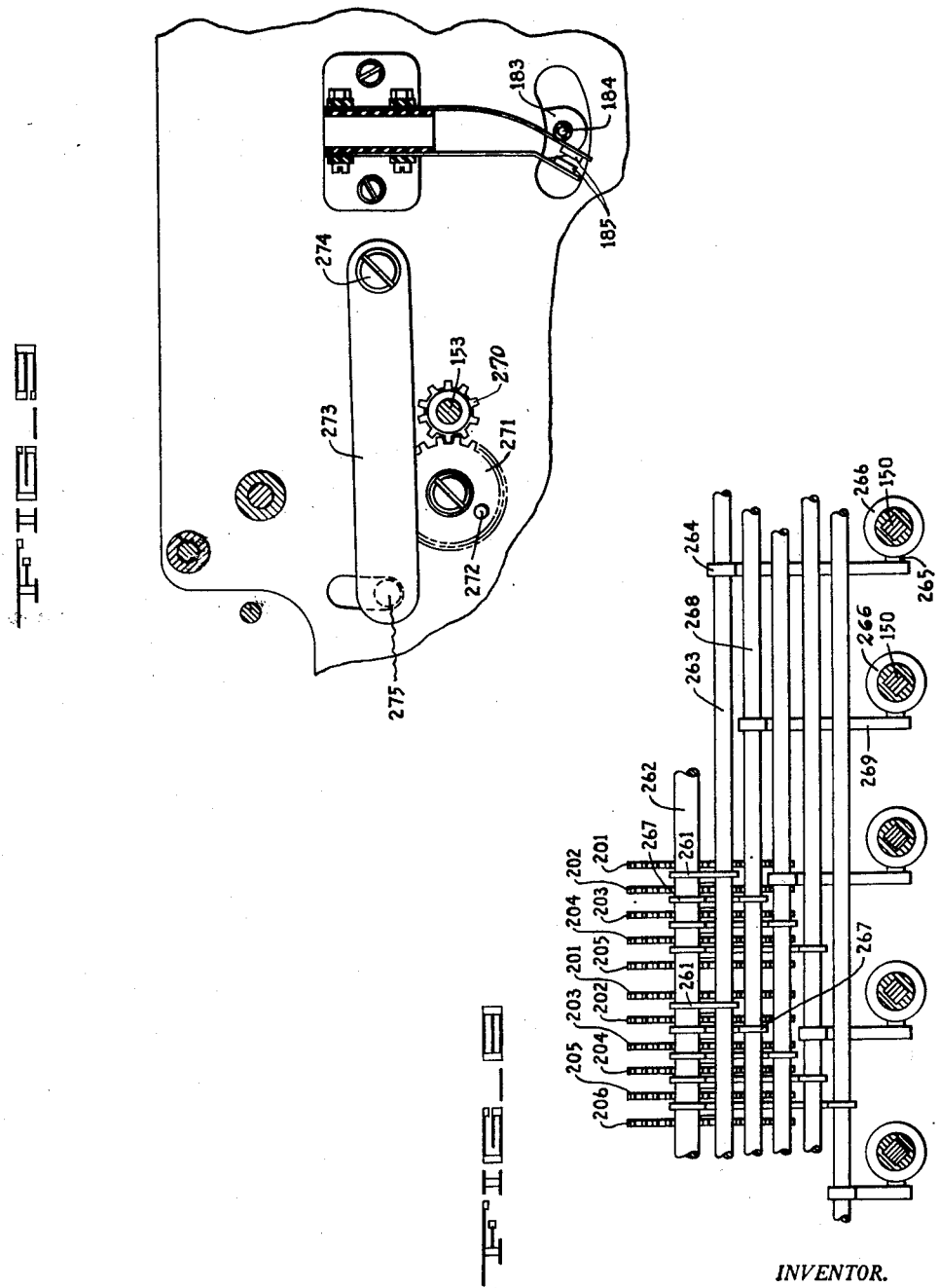

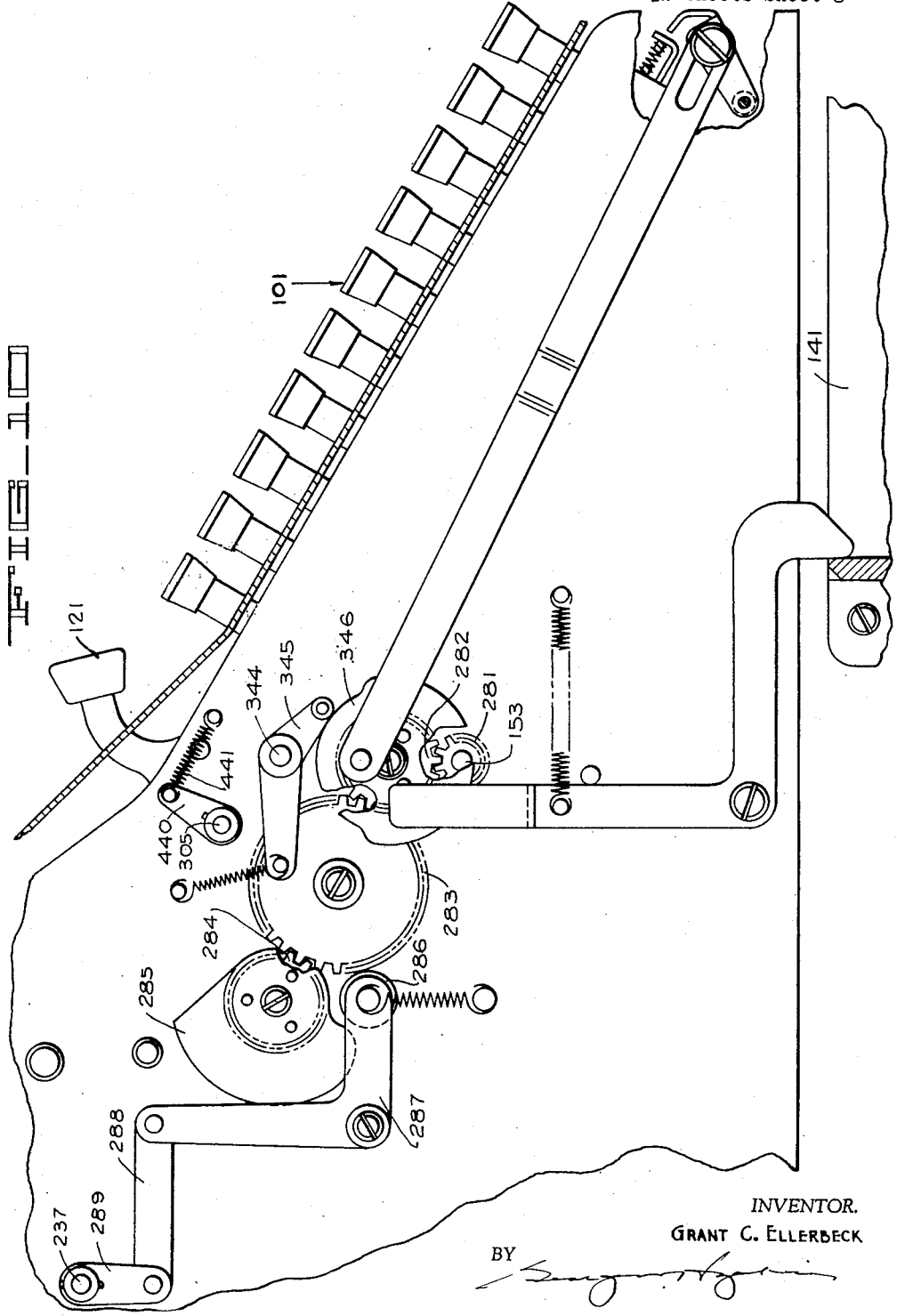

Feb. 9, 1954        G. C. ELLERBECK        2,668,660
PLURAL TOTALIZER ADDING MACHINE
Original Filed Aug. 12, 1946        12 Sheets-Sheet 9
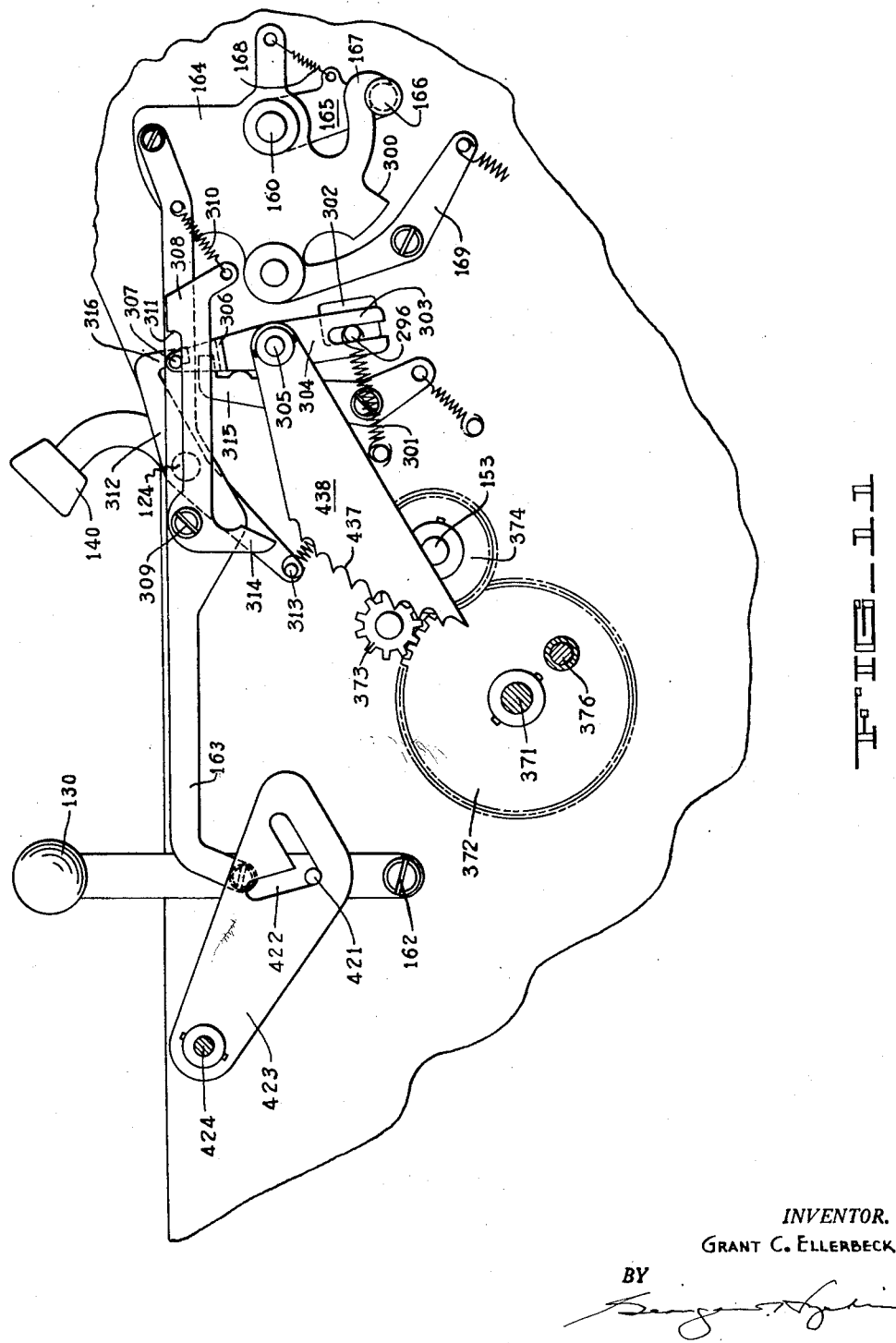
*INVENTOR.*
GRANT C. ELLERBECK
BY

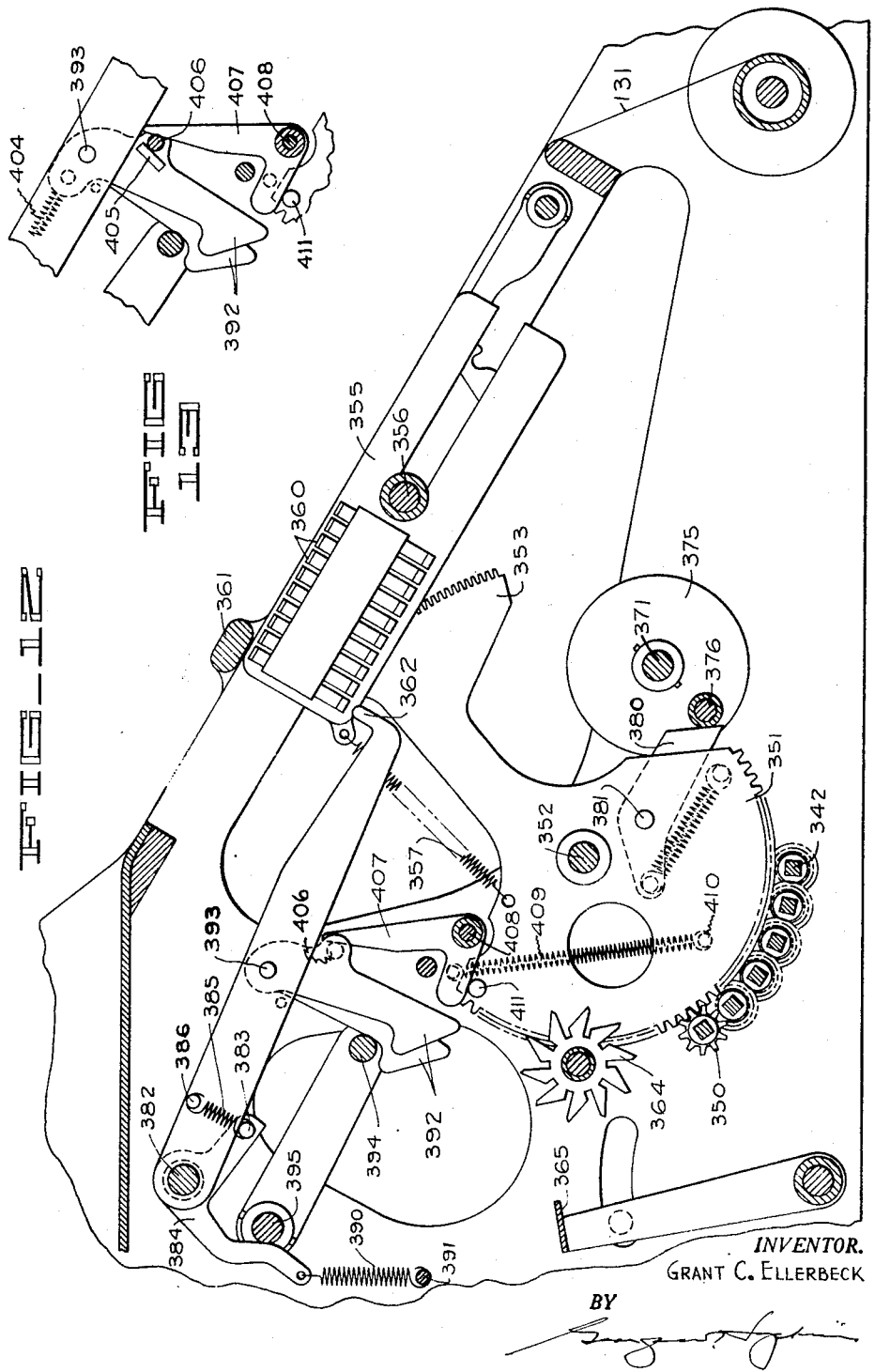

Feb. 9, 1954 G. C. ELLERBECK 2,668,660
PLURAL TOTALIZER ADDING MACHINE
Original Filed Aug. 12, 1946 12 Sheets-Sheet 11
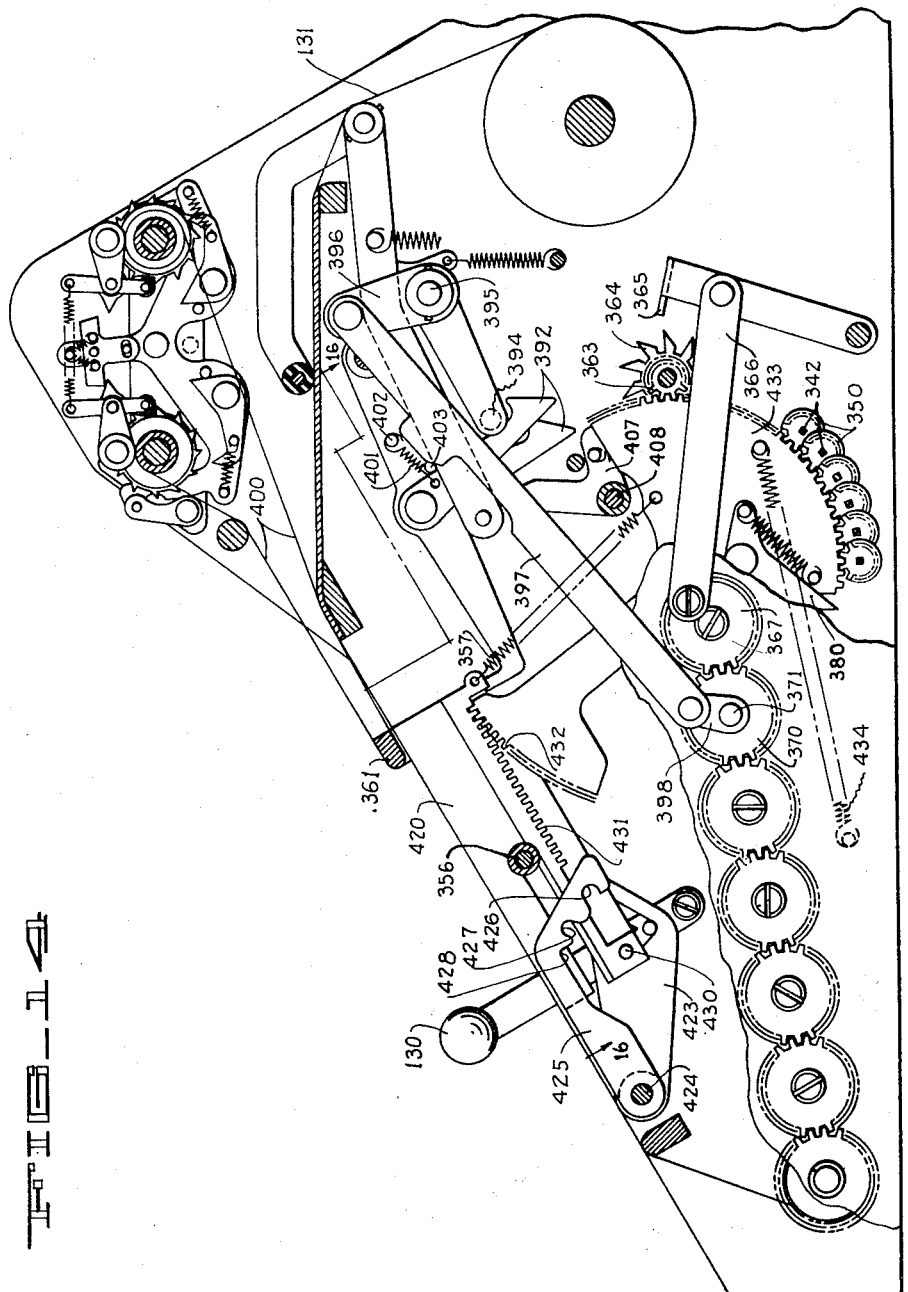
INVENTOR.
GRANT C. ELLERBECK
BY

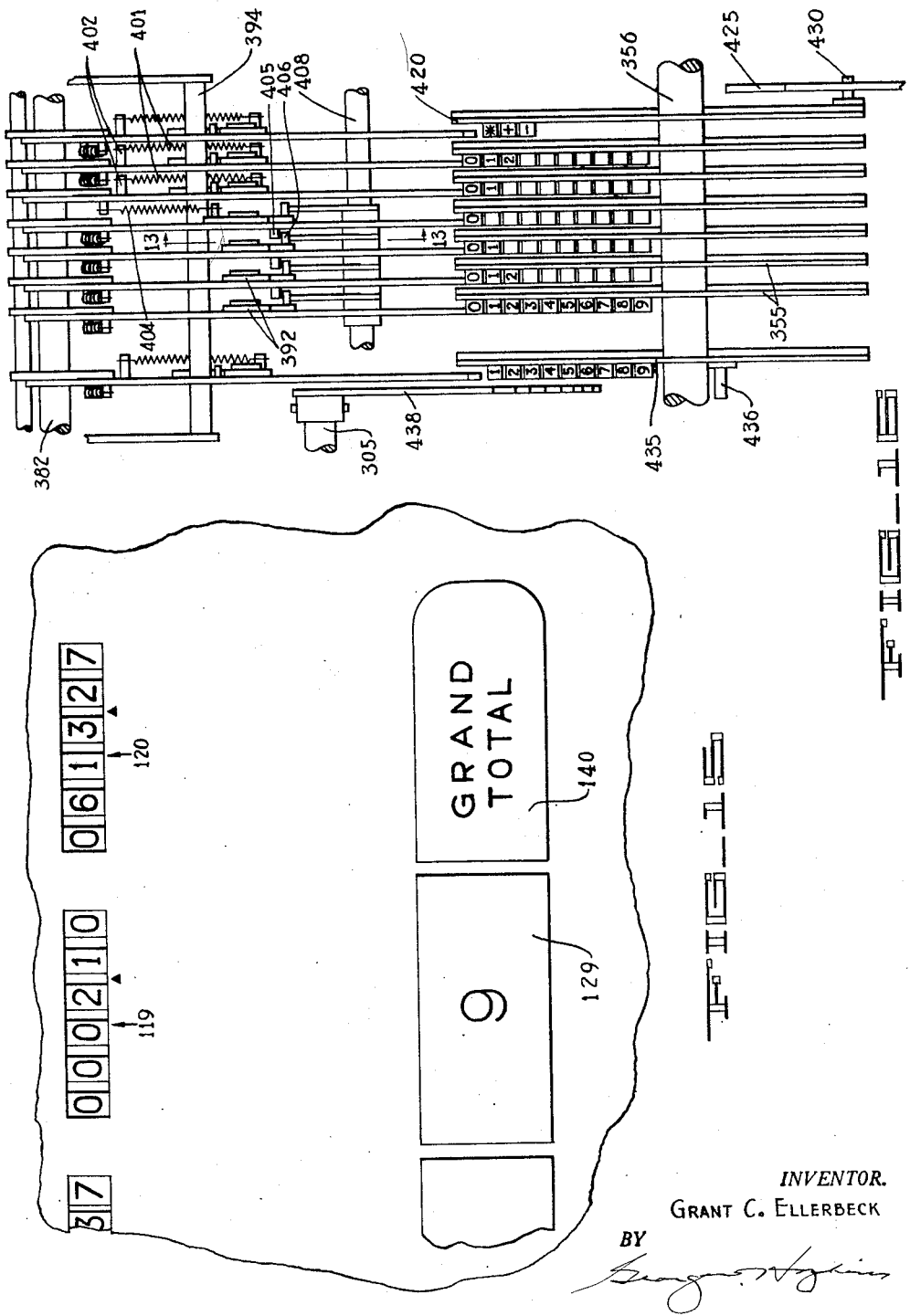

Patented Feb. 9, 1954

2,668,660

UNITED STATES PATENT OFFICE 2,668,660

PLURAL TOTALIZER ADDING MACHINE

Grant C. Ellerbeck, San Leandro, Calif., assignor to Friden Calculating Machine Co., Inc., a corporation of California Original application August 12, 1946, Serial No. 690,004. Divided and this application June 24, 1949, Serial No. 101,007

7 Claims. (Cl. 235—60.27)

This invention relates to business machines. This application is a division of my application Serial No. 690,004 filed August 12, 1946, now Patent No. 2,586,420 issued February 19, 1952, which is a continuation-in-part of my co-pending application Serial No. 502,379, filed September 13, 1943, now Patent Number 2,405,562 issued August 13, 1946.

An object of the invention is to provide a business machine having a keyboard in which values may be set and a plurality of totalizers in which a value set in the keyboard can be selectively registered either additively or subtractively, together with a grand totalizer which, during registering operations always reflects the sum of the totals in the individual totalizers.

Another object of the invention is to provide mechanism for taking totals selectively from any of the individual totalizers without subtracting the value from the grand totalizer.

A further object of the invention is to provide each of the totalizers with a key which when depressed selects the corresponding totalizer for entry and initiates the registering operation.

Another object of the invention is to provide a mechanism for printing any item set on the keyboard and any total standing in the totalizer.

A further object of the invention is to provide a single registration control mechanism for controlling the registration in a plurality of totalizers.

Other objects of the invention will be evident after the following disclosure.

In the drawings:

Figure 1 is a front view of a machine in which the invention has been employed.

Figure 2 is a partial vertical longitudinal section through the machine taken as indicated by the line 2—2 in Figure 1.

Figure 3 is a detailed view taken as indicated by the line 3—3 in Figure 2.

Figure 4 is a partial vertical longitudinal section taken on the line 4—4 in Figure 1.

Figure 5 is a partial vertical longitudinal section taken on the line 5—5 in Figure 1.

Figure 6 is a plan view of the mechanism disposed in the rear part of the machine with the cover removed and parts broken away. The direction in which the view is taken is indicated by the line 6—6 in Figure 2.

Figure 7 is a partial rear elevation of the machine with the cover removed and parts broken away. The direction in which the view is taken is indicated by the line 7—7 in Figure 2.

Figure 8 is a fragmentary vertical transverse section taken as indicated by the line 8—8 in Figure 2.

Figure 9 is a fragmentary view of the parts disposed behind parts shown in Figure 5.

Figure 10 is a left side elevation with the cover removed and parts broken away. The direction of the view is indicated by the line 10—10 in Figure 1.

Figure 11 is a fragmentary vertical longitudinal section taken as indicated by the line 11—11 in Figure 1.

Figure 12 is a vertical longitudinal section taken on the line 12—12 in Figure 1.

Figure 13 is a fragmentary section taken as indicated by the line 13—13 in Figure 16.

Figure 14 is a vertical longitudinal section taken on the line 14—14 in Figure 1.

Figure 15 is an enlarged portion of Figure 1 showing an individual totalizer and the grand totalizer with the control keys therefor.

Figure 16 is a fragmentary section taken as indicated by the line 16—16 in Figure 14.

General description

In constructing the machine I have employed the keyboard, selecting mechanism and the registration control mechanism comprising the digitation mechanism, the transfer mechanism and the reversing mechanism employed in the "Friden" calculating machine. For a complete disclosure of this part of the mechanism reference is to be had to the patent to Friden 2,229,889, issued January 28, 1941. This portion of the mechanism will be described first and thereafter I will describe how this basic registration control mechanism is utilized to cause registration in any selected one of a plurality of totalizers and in a grand totalizer.

Referring to Figure 1, the machine is provided with a suitable casing 100 and has a conventional keyboard 101 comprising a plurality of rows of numeral keys numbered 0 to 9. A plurality of totalizers 111, 112, 113, 114, 115, 116, 117, 118, 119 and a grand totalizer 120 are arranged in a row at the top of the machine and have dials bearing numerals which are visible through suitable windows provided in the casing 100. After a number has been set up on the keyboard 101 the operator determines in which totalizer the number is to be registered and for this purpose a series of totalizer keys 121, 122, 123, 124, 125, 126, 127, 128, 129 are provided, also the item may be registered additively or subtractively in the selected totalizer by setting the lever 130 either in the add or subtract position. For example, if the lever 130 was set in the add position and a number had been set on the keyboard 101 when the operator depressed the totalizer key 123 the value set on the keyboard would be additively registered in the totalizer 113, and it would also be additively registered in the grand totalizer 120. If the lever 130 had been set in the subtract position the value would be subtractively registered in the selected totalizer and in the grand totalizer so that during a series of registering operations, assuming all of the totalizers had been cleared at the beginning of the operation, the grand totalizer will indicate the sum of all the totals in the individual totalizers 111 to 119.

At the same time that the value set in the keyboard is registered it is printed on a paper tape 131 which appears in a window 132 in the casing. As shown in Fig. 1 the item 217.23 had been set on the keyboard 101 and the totalizer key 129 had been depressed with the control lever 130 in the subtract position, the figure "9" at the left edge of the tape indicates the number of the totalizer in which the value 217.23 was registered and the sign of the registration is indicated by the minus sign thereafter. The printing mechanism which will presently be described is indirect in operation, that is, all of the printing mechanism is disposed below the tape 131. This method of printing was first disclosed and claimed in my co-pending application Serial No. 502,379, now Patent No. 2,405,562 issued August 13, 1946.

When the operator desires to take an individual total he moves the control lever 130 to the "total" position and copies the figure appearing in the individual totalizer to the keyboard and presses the associated individual totalizer key. This causes the value to be subtracted from the individual totalizer thereby clearing the individual totalizer, but the figure is not subtracted from the grand totalizer, and the total taken is printed on the tape 131. In order to take a grand total the same procedure is followed and the grand total key 140 is depressed. This causes the figure standing in the grand totalizer to be subtracted, thereby clearing the grand totalizer.

If desired, my machine can be employed as a cash register and for this purpose is provided with a cash drawer 141.

Having now described in general the arrangement and operation of my machine I will explain its construction in detail.

Registration control mechanism

Referring to Fig. 2, depression of the numeral key 142 in the keyboard 101 causes differential movement of either of two slides 143, 144 which move selector gears 145, 146 in the path of segmental gears 147 secured to actuator shaft 148 so that upon rotation of the shaft 148 a square shaft 150, on which the selector gears 145 and 146 are mounted will be rotated a differential amount corresponding to the key 142 depressed. This is the digitation part of the registration and occurs in the first part of the cycle. The transfer occurs in the latter part of the cycle and is effected by shifting the transfer gear 151, which is mounted on the square shaft 150, into the path of a transfer tooth 152 on the actuator shaft 148. This causes the added increment of "1" to be imparted to the square shaft 150. The actuators shafts 148 are driven by means of bevel gearing from drive shaft 153 which is uni-directional in operation so that the square shafts 150 are also uni-directional in operation. In order to obtain positive or negative registration, a reversing gear is employed which comprises a pair of bevel gears 154, 155 integrally connected by a sleeve 156 slidable on the square shaft 150. As shown, the gear 154 is engaged with a bevel gear 157 (see also Fig. 3) which is secured to a pinion 158 (Fig. 2) which is constantly in mesh with a pinion 159 rotatable on a shaft 160. Secured to the shaft 160 are a series of arms 161, one for each reversing gear 154, 155 so that rotation of the shaft 160, in a clockwise direction in Fig. 2, will cause shifting of the reversing gears 154, 155 to engage the bevel gears 155 with the bevel gears 157 to cause positive registration. As shown in Fig. 2 the reversing gear is in the negative registration position.

The registration control mechanism described above is substantially identical to the aforementioned patent to Friden 2,229,889.

Sign control

In this machine the sign control is pre-set prior to registration and comprises the lever 130 (Figs. 1 and 11) which as shown is in the subtract position. This lever is pivoted in the framework at 162 and is connected by a link 163 with a plate 164 rotatably mounted on the shaft 160. The shaft 160 has secured thereto an arm 165 provided with a pin 166 which is normally held in engagement with a hook 167 on the plate 164 by a spring 168. The plate 164 is provided with a detent 169. As shown the parts are positioned in the subtract position. In order to determine additive registration the control lever 130 is moved rearwardly, that is clockwise in Fig. 11, which causes the plate 164 to be rotated clockwise and the hook 167 engaging the pin 166 rotates the arm 165 and shaft 160 clockwise. This causes shifting of the reversing gears 154—155, as previously described, to the additive position. If the control lever 130 and the reversing gears 154—155 are in their additive positions, and the lever 130 is then rocked to the subtractive position shown in Fig. 11, the pin 166 on the arm 165 is held against the hook 167 by the spring 168, thus causing the arm 165 and shaft 160 to follow the plate 164 and rock counter-clockwise. This will shift the reversing gears 154—155 to the position shown in Fig. 2.

Drive

The machine is provided with a motor 170 (Fig. 4) whose armature shaft 171 has a worm 172 thereon engaging a worm wheel 173. The worm wheel 173 is connected by means of a sleeve 174 to a ratchet wheel 175 (Fig. 5) of a pawl and ratchet clutch 176. The pawl 177 of the clutch is normally held disengaged from the ratchet wheel by a control lever 178 pivotally mounted at 179. Clutch control lever 178 is connected by a link 180 to a lever 181 having pin and slot connection 182 with a lever 183 having a fiber pin 184 therein which extends through an opening in the frame (Fig. 9) for operating the motor switch 185. A spring 186 (Fig. 5) normally urges the parts to the position shown where the switch 185 is open and the clutch 176 is disengaged. Clockwise rotation of the control lever 178 (Fig. 5) by means hereinafter described causes closure of the switch 185 and engagement of the clutch 176.

The driven side of the clutch is secured to the previously described transversely extending main drive shaft 153.

Totalizers

The machine is provided with a plurality of item totalizers 111 to 119 and a grand totalizer 120. All of these totalizers are of substantially identical construction although they may vary in capacity, so that a description of one will suffice. Each totalizer comprises a plurality of numeral wheels 187 (Fig. 2) each having a spur gear 188 secured thereto. The numeral wheels are rotatably mounted on a shaft 189 which is supported in a pair of bellcranks 190, 191 (see Fig. 7). The bellcranks 190, 191 are identical in shape and are rigidly connected together by tie rods 192, 193, 194, 195, 196, 197, 198 and a sleeve 199. The sleeve 199 is rotatable on a fixed shaft 200. It will be understood that each of the totalizers is similarly mounted, each in its own supporting framework, the several supporting frames being individually rotatable about the shaft 200.

*Registration transmission mechanism*

It will be recalled that the conventional registration control mechanism has been described as comprising a keyboard 101 (Fig. 1) having six rows of keys which control the setting of digitation gears 145, 146 (Fig. 2) on square shafts 150, of which in this instance there are six, one for each row of keys, and that each of these shafts is provided with a transfer gear 151 and a reversing gear so that in each order of the registration control mechanism means are provided for selectively controlling the differential rotation and direction of rotation of a gear 159. There are six gears 159 on the shaft 160. In order to selectively transmit the rotation of these gears to any selected totalizer and the grand totalizer a registration transmission mechanism is provided. This comprises a plurality of series of ordinal actuator gears, there being one series for each totalizer, and means for causing like movement of all gears of like order. For example, associated with totalizer 113 (Figs. 1 and 2) which has a capacity of six orders, there are six actuator gears 201, 202, 203, 204, 205, 206 (Figs. 2 and 6), the gear 201 being in the units order, the gear 202 in the tens order, etc. All of the units order gears 201 are geared together by means of pinions 211 on a square shaft 212. For example the units order actuator gear in totalizer 113 is connected to the units order gear 201 and the totalizer 115 by means just described as can be seen in Fig. 7. Similarly, the gear 202 in the tens order of totalizer 113 is connected to the tens order gear 202 in the totalizer 115 and to all other tens order gears by means of pinions 213 on square shaft 214. All of the hundreds order gears 203 are connected together by means of pinions 215 on square shaft 216. All of the thousands order gears 204 are connected together by pinions 217 on a square shaft 218; and all of the tens thousands order gears 205 are connected together by pinions 219 on a square shaft 220. As previously stated, the totalizers may vary in capacity. In the form shown, the item totalizers 111, 112, 114, 115, 116, 117, and 118 all have five orders, and item totalizers 113, 119, and grand totalizer 120 all have six orders. The pinions 211, 213, 215, 217, and 219, and the square shafts 212, 214, 216, 218, and 220 just referred to provide for concurrent operation of the actuator gears 201, 202, 203, 204, and 205 of corresponding orders of the first five orders of each item totalizer and the grand totalizer. The sixth order actuator gears 206, in the item totalizers 113, 119, and the grand totalizer 120 only, are operatively connected by pinions 221 on a square shaft 222. The registration transmission mechanism receives its motion in the following manner. The square shaft 150 in the units order, that is, the square shaft associated with the units order in the keyboard, transmits its registering movement to the pinion 159 in mesh with the units order gear 201 in the totalizer 118 and this motion is transmitted via the pinions 211 on the square shaft 212 to all the units order gears 201 in the other totalizers including the grand totalizer. The square shaft 150 associated with the second order of the keyboard transmits its motion to the actuator gear 202 in the totalizer 117 which in turn transmits the same motion via the gears 213, the square shaft 214 to all the other tens gears 202, etc. It will be understood that for every revolution of the main drive shaft 153 the differential rotation of the shafts 150 is transmitted to all of the actuator gears so that, for example, all of the units order gears 201 rotate in unison, all of the tens order gears 202 rotate in unison, etc.

*Totalizer keys*

The totalizer gears 188 (Fig. 2) are all normally out of engagement with the differential actuator gears. If it is desired to cause registration in a selected totalizer, for example, the totalizer 113, the item is first set up on the keyboard 101, the lever 130 is set to the desired add or subtract position and then the key 123 is depressed. The key 123 (Fig. 2) is pivotally mounted at 124 and is connected by a spring 125 to the tie rod 197 so that rocking the key 123 clockwise through the urgency of the spring 125 rocks the framework in which the totalizer is mounted counter-clockwise about the shaft 200, engaging the gears 188 of the totalizer with the actuator gears. A detent 223 which normally centralizes the numeral wheel and restrains it from rotation is removed from engagement with the gear 188 when the framework is rocked counter-clockwise by a fixed transversely extending rod 224. The engagement of the detent 223 with the rod 224 normally holds the associated actuator framework 190—191 in the inactive position shown in Fig. 1.

Depression of the key 123 also initiates the drive as will now be explained. Each of the item totalizers 111 to 119 has associated therewith a plate 230 rotatably mounted on a shaft 231 and urged clockwise by a spring 232. The construction and operation of these plates is the same with respect to each totalizer so a description of one will suffice. Referring to Fig. 2, the plate 230 has a shoulder 233 which engages the tie rod 192 to latch the plate 230 in its Fig. 2 position and to assist in holding the totalizer framework in the position shown, that is, with the totalizer gears out of mesh with the actuator gears. However, upon depression of the key 123 the rod 192 is removed from contact with the shoulder 233 and the spring 232 rotates the plate 230 clockwise so that a shoulder 234 engaging a roller 235 on an arm 236 secured to a shaft 237 causes counter-clockwise rotation of the shaft 237. Each plate 230 has an arm 236 associated therewith and all of the arms 236 are secured to the shaft 237. The right end (Fig. 5) of the shaft 237 has secured thereto an arm 238 having pivotally connected thereto link 239 which has a pin and slot connection 240 at its forward end with a clutch control lever 178. Thus it will be seen that depression of the key 123 (Fig. 2) will unlatch the spring-urged plate 230 which rocks the shaft 237 counter-clockwise causing the link 239 (Fig. 5) to be drawn rearwardly to rock the clutch control arm 178 clockwise and cause closure of the switch and engagement of the clutch whereupon the shaft 153 rotates.

The registration transmission mechanism is normally locked. Referring to Fig. 5 the actuator gears such as 203 associated with the grand totalizer 120 are constantly in mesh with pinions 241 integral with gears 242 which are locked by a bail 243 pivoted at 244. One arm 245 of the bail appears in Fig. 5, the other arm 246 appears in Fig. 4. The bail 243 is normally urged counter-clockwise (Fig. 4) by a lever 247 pivoted at 244 having pin 248 which engages the arm 246, the lever 247 being urged counter-clockwise by the spring 249. In the full cycle position of the clutch, a cam 250 secured to the main drive shaft 153 engages a pin 251 in the lever 247 which, through a spring 252 urges the bail 243 clockwise (Fig. 4) or counter-clockwise as viewed in Fig. 5 to lock the gears 242 and thereby lock the entire registration transmission mechanism. However, as soon as the clutch 176 is engaged the cam 250 (Fig. 4) rotates and the lever 247 is free to move under the influence of its spring 249 thereby withdrawing the locking bail 243. Rotation of the shaft 153 causes operation of the registration control mechanism and through the registration transmission mechanism just described causes entry of the value set in the keyboard 101 in the selected totalizer.

This occurs during the digitation phase of the first part of the cycle. The transfer occurs in the latter part of the cycle. It will be recalled that the transfer movement is transmitted to the shaft 150 (Fig. 2) by a transfer gear 151 having been moved into the path of the transfer tooth 152 on the actuator shaft 148.

In accordance with my invention a single series of ordinally arranged registration control mechanisms, that is, the square shafts 150 and the pinions 145, 146 and 151 thereon serve, through the registration transmission mechanism previously described, to service any selected totalizer. This is true not only of the digitation part of the registration, but the transfer part also as will now be described.

When any selected totalizer, such as totalizer 113 (Figs. 2, 6 and 8), is moved into engagement with its actuator gears by depression of the key 123, a transfer tooth 260 on the numeral wheels in the totalizer, except the highest order, is moved into cooperative relationship with a transfer lever 261 pivoted on a shaft 262. All of the transfer levers 261 associated with the units order numeral wheels in the totalizers are secured together by transversely extending rods 263 and also rigidly secured to the rods 263 is a lever 264 (Fig. 8) having a pin 265 which engages the flanged portion 266 of the transfer gear 151 on the square shaft 150 in the tens order. From this it will be apparent that whenever any totalizer is in registering position and the units order numeral wheel passes through 0 to 9 position the associated transfer lever 261 will cause rocking of the rods 263 and the lever 264 to move the transfer gear 151 in the tens order of the registration control mechanism to operative position so that in the transfer phase of the cycle a transfer movement will be transmitted from the tens order square shaft 150 through the registration transmission mechanism to the totalizer in registering position.

Similarly, the numeral wheels in the tens order of the totalizers have transfer teeth adapted to cooperate with transfer levers 267 which are rigidly connected together by transverse rods 268 having secured thereto a lever 269 (Fig. 8) which serves to set the flanged portion 266 of the transfer gear 151 in the hundreds order of the registration control mechanism. In this same manner transfer mechanism is provided for the higher orders of all the totalizers.

In each registering operation of the machine the main drive shaft 153 revolves twice. During the first revolution the value set in the keyboard 101 is registered in the one of the item totalizers 111 to 119 which has been selected by depression of one of the keys 121 to 129. In the second revolution the same value is entered in the grand totalizer 120.

The main drive shaft 153 is automatically caused to rotate twice by the following mechanism. The main drive shaft 153 (Fig. 9) has a pinion 270 engaging a gear 271 having a pin 272 thereon. The gear 271 rotates once for two revolutions of the pinion 270 so that prior to the conclusion of the first revolution of the shaft 153 the pin 272 engages an arm 273 pivoted to the frame at 274 and rocks it clockwise. The arm 273 has a pin 275 secured thereto which passes through a slot in the frame 275 and engages in a slot 276 of a link 277 (Fig. 5) pivoted at 278 to the clutch control lever 178. When the clutch control lever 178 is rocked clockwise (Fig. 5) to engage the clutch the link 277 is drawn forwardly, moving a tail 279 thereon forwardly of a fixed pin 280 so that when in the course of the first cycle the pin 275 moves upwardly, it disposes the tail 279 in front of the pin 280 thereby locking the clutch control lever 178 from disengaging the clutch at the end of the first revolution. As will be evident in in Fig. 9, in the course of the second revolution the pin 272 releases the lever 273 so that the tail 279 (Fig. 5) is lowered below the pin 280 by gravity or by a conventional restoring spring (not shown) so that at the end of the second revolution the spring 186 may move the clutch control lever 178 counter-clockwise to disengage the clutch.

At the conclusion of the first revolution the item totalizer is disengaged from the actuator gears. This is accomplished by the following mechanism. The main drive shaft 153 (Fig. 10) has a pinion 281 secured thereto engaging a gear 282 which meshes with an idler gear 283 engaging a gear 284 secured to a cam 285. This gear train causes one revolution of the cam 285 for two revolutions of the shaft 153. Cam 285 is shown in the full cycle position of the parts, and after 180° rotation clockwise engages a roller 286 on a bellcrank 287 connected by a link 288 with an arm 289 secured to shaft 237 causing the shaft 237 to be rocked counter-clockwise as viewed in Fig. 10, or clockwise as viewed in Fig. 2.

This clockwise rotation of the shaft 237 causes the arms 236 to rotate clockwise (Fig. 2), and the plate 230 associated with the totalizer which had been in the operative position is rotated counter-clockwise. The plate 230 has a portion 290 which moved under the rod 192 when the plate 230 was unlatched and this portion served to hold the totalizer gears in engagement with the actuator gears. When, as just described, the plate 230 is moved counter-clockwise it releases the rod 192 and a portion 291 engages the rod 192 and positively rocks the totalizer supporting framework clockwise to remove the totalizer gears from engagement with the actuator gears. At the end of the second revolution of the shaft 153 (Fig. 10), or at the end of the revolution of the cam 285, the roller 286 is free and the plate 230 (Fig. 2) returns to the position shown under the influence of a spring 232.

Grand totalizer

At the beginning of the second cycle of the main drive shaft 153 (Fig. 4) the grand totalizer is automatically moved to registering position. The shaft 153 has a pinion thereon (not shown) engaging a gear 292 having a cam 293 secured thereto. The cam 293 makes one revolution for every two revolutions of the shaft 153. Cam follower 294 is rocked counter-clockwise on its pivot 295 after the cam 293 is rotated 180° clockwise. The cam follower 294 normally engages a pin 296 on a member 297 resiliently mounted on a link 298 pivoted to the tie rod 198 of the grand totalizer supporting framework. By means presently to be described, the pin 296 is normally disposed in cooperative relation with the cam follower 294 as shown in Fig. 4 so that cam 293, through the action of the cam follower 294, causes the totalizer 120 (Fig. 5) to be moved into engagement with its actuator gears during the second revolution of the drive shaft 153. During this revolution the value set in the keyboard 101 is registered in the grand totalizer 120 and in the latter part of the second revolution any transfers which may occur in the grand totalizer are effected in the same manner and by the same means already described. Thus it will be seen that the registration control mechanism serves during the first cycle of the operation to cause registration in one of the item totalizers 111 to 119 and during the second revolution controls the registration of the same value in the grand totalizer 120 and also effects any transfer which may occur there.

Taking totals

In order to take a total from any totalizer the control lever 130 (Fig. 1) is moved to the "total" position. Usually in a business machine of this character total taking is done at the conclusion of a related series of operations, as for example, at the conclusion of a day's work so that usually all of the totalizers are cleared one by one. In this machine totals are taken by copying the number from the totalizer to the keyboard and then depressing the totalizer key. This causes, in the case of the item totalizer, subtraction of the value from the totalizer leaving the totalizer clear, but without subtracting the value from the grand totalizer. This, of course, is to preserve the grand total. As previously described, during registering operations when the control lever 130 is either in the "add" or "subtract" position items registered in any selected item totalizer are also registered in the grand totalizer.

Referring to Fig. 11. When adjusting the control lever 130 to the "total" position it is moved counterclockwise from the position here shown. This causes counterclockwise rotation of the plate 164. If the lever 165 is already in the subtract position, as shown, it will remain there, the hook 167 merely leaving the pin 166. If the plate 164 and the arm 165 are in their add positions, and the plate 164 is rocked counter-clockwise to the total taking position, the spring 168 will cause the lever 165 to follow, thereby rocking the shaft 160 counter-clockwise and shifting the reversing gears 154—155 to the subtract position shown in Fig. 2. If, at the start of this operation, the arm 165 should not respond to the pull of the spring 168, a shoulder 300 on the plate 164 will engage the pin and positively start rocking of the arm 165 and shaft 160.

It will be recalled that the shaft 160 controls the registering mechanism as well as the reversing gears. Therefore, with the control lever 130 in the "total" position, values copied from the item totalizers 111 to 119 (Fig. 1) to the keyboard 101, will, upon depression of the totalizer keys 121 to 129, subtract the totals therefrom.

While totals are being taken from the item totalizers, the grand total is maintained in the grand totalizer 120 by the following mechanism. Referring to Fig. 4, it will be recalled that the automatic movement of the grand totalizer to registering position depended upon the pin 296 being in cooperative relation with the follower 294. Referring to Fig. 11, the pin 296 is normally urged to this position by a spring 301 which holds the pin against the side of a slot 302 in the frame. The pin 296 is disposed in the lower forked end 303 of a lever 304 pivoted at 305 having a shoulder 306 and a pin 307 thereon. When the lever 130 is moved counter-clockwise from the position shown in Fig. 11 the link 163 is moved to the left. This link has a lever 308 pivoted thereto at 309 and urged counter-clockwise by a spring 310 so that the upper edge of the lever 308 engages the pin 307. When the link 163 is moved to the left, a shoulder 311 on the lever 308 engages the pin 307 and rocks the lever 304 counter-clockwise to move the pin 296 rearwardly so that it is moved out of cooperative relation with the follower 294 (Fig. 4).

To take a grand total, however, pin 296 must be restored to its normal position, and this is effected by a lever 312 which rotates in unison with the grand total key 140 so that upon depression of the grand total key 140 with the lever 130 set in the total taking position, a pin 313 on the lever 312 will engage a tail 314 on the lever 308 and rock the lever 308 clockwise on its pivot to disengage the shoulder 311 from the pin 307, thereby releasing the lever 304 and permitting the pin 296 to return to its operative position under the influence of its spring 301. A lever 315 has a nose which is disposed between the shoulder 306 on the lever 304 and a nose 316 on the lever 312 so that with the control lever 130 in either the add or subtract position the grand total key 140 cannot be depressed. When, however, the control lever 130 is moved to the total taking position and the lever 304 is rotated counter-clockwise, it rotates the lever 315 counter-clockwise, removing the nose thereof from the path of the nose 316 on the lever 312.

It will be understood that in taking totals from the item totalizers 111 to 119 the subtraction of the value from the totalizer occurs in the first revolution, and the second revolution is an idle revolution because the grand totalizer is not moved into registering position. On the other hand, in taking a grand total, the first revolution is an idle revolution and in the second revolution the value is subtracted from the grand totalizer.

Printing

As previously stated, each item entered into the item totalizers and the grand totalizer is printed on the tape 131 (Fig. 1) together with an identifying character to show whether it was added or subtracted, and in which totalizer it was registered. The totals are also printed. Because of the fact that totals are taken by copying the figures from the totalizers to the keyboard, totals as well as items can be printed in the same manner, that is, any figure set in the keyboard is printed when any of the item totalizer keys 121 to 129 are depressed during registering operations, and whenever any of these and the grand total key 140 are depressed when taking totals.

Referring to Fig. 2. Each square shaft 150 has a sleeve 330 slidable thereon and rotatable therewith. Integral with each sleeve 330 is a bevel gear 331 which, when the machine is at rest, is in engagement with a bevel gear 332. Bevel gears 332 have spur gears 333 integral therewith which engage gear sectors 334 pivoted on a common shaft 335. Integral with each gear sector 334 is a gear sector 340 engaging a pinion 341 on a square shaft 342. It is to be understood that in each order of the selecting mechanism the mechanism just described is duplicated so that at the outset of the operation the square shafts 150 are geared to the transversely extending square shafts 342 and they remain geared thereto during the digitation phase of the first cycle in order to transmit to the shaft 342 differential movements respective of the value set in the keyboard.

Prior to the transfer phase in the first cycle, however, all of the bevel gears 331 are disengaged from the bevel gears 332. For this purpose each sleeve 330 is engaged by an arm 343 secured to a common shaft 344. Referring to Fig. 10, the left end of the shaft 344 has secured thereto a cam follower 345 which cooperates with a cam 346 secured to the gear 282. The gear 282 rotates clockwise, as shown in Fig. 10, at one-half the speed of the main drive shaft 153 so that after the digitation phase of the first cycle, cam 346 rocks the follower 345 of the shaft 344 counter-clockwise to move the arm 343 (Fig. 2) clockwise thereby disengaging the bevel gears.

Square shafts 342 extend transversely to the right side of the machine where, as shown in Fig. 12, they are connected by pinions 350 to gear segments 351, rotatably mounted on a shaft 352. Each gear segment 351 has formed integrally therewith a gear segment 353 engaging a rack (not shown) on a type bar 355 slidable on a shaft 356. Each gear segment 351 is connected to its type bar 355 by a spring 357 which maintains the gear segment 353 and the rack (not shown) in mesh. Mounted on each type bar 355 are individual type 360 bearing numerals 0 to 9 as shown in Fig. 16. It is to be understood that during the digitation phase of the first cycle the type bars 355 are differentially displaced amounts corresponding to the value in the keyboard so that after the type bars have been set the type 360 bearing the required numeral is disposed between a fixed transverse platen 361 and a hammer 362, there being a hammer 362 for each type bar 355.

Before the bevel gears 331, 332 are disengaged the setting of the type bars is retained therein by the following mechanism. Each gear segment 351 (Fig. 12) has engaged therewith a pinion 363 (Fig. 14) and an aligner wheel 364. All of the aligner wheels 364 are engaged by a common bail 365 after the type bars have been set. The bail 365 is connected by a link 366 to a gear 367 meshing with the gear 370 on a shaft 371. The shaft 371 (Fig. 11) has a gear 372 thereon which engages an intermediate gear 373 which meshes with the gear 374 on the main drive shaft 153. Interconnecting the gear 372 and a disk 375 on the shaft 371 (Fig. 12) is a rod 376 which is shown in the full cycle position where it engages lever 380 pivoted at 381 on gear sectors 351.

The levers 380 are spring-urged counter-clockwise (Fig. 12) and the rod 376 releases the levers 380 so that the gear sectors 351 are free to be set. At the conclusion of the operation the rod 376 engages the levers 380 and restores all the gear sectors 351 to their normal position.

The type hammers 362 are pivotally mounted on a fixed shaft 382. Each hammer 362 overlies a pin 383 on a bellcrank 384 rotatably mounted on the shaft 382. A spring 385 is attached at one end to the pin 383 and at the other end to a pin 386 in the hammer. The bellcrank 384 is connected by a spring 390 to a fixed rod 391. Each hammer 362 has a hook 392 pivoted thereto at 393. When a hook 392 is disposed in active position it is adapted to be engaged by a bail 394 secured to a shaft 395. Shaft 395 has an arm 396 (Fig. 14) secured thereto which is connected by a link 397 to an arm 398 on shaft 371 so that upon rotation of the shaft 371 the bail 394 picks up all hooks 392 in the active position and holds the hammers 362 connected thereto downwardly, tensioning their springs 390 until the hooks slip off the bail 394 and the springs 390 cause the hammers 362 to strike the type 360. The type strikes the underside of the paper tape 131. The ribbon 400 passes around the fixed platen 361 and is disposed between the platen and the upper surface of the paper. The impression is taken from the ribbon and appears on the upper face of the paper. This indirect mode of printing is disclosed in the aforementioned Patent No. 2,405,562.

The hooks 392 are so arranged that the first two orders are always printed while the higher orders are printed only up to the first significant figure. For this purpose the hooks 392 in the first two orders (see Fig. 16) are connected by springs 401 to pins 402 on the corresponding hammers. Pins 403 limit their movement. Springs 401 thus serve to hold the hooks 392 in the first two orders in their rearward or active position where they are always picked up by the bail 394. The hook 392 in the third order (see Figs. 13 and 16) has a spring 404 which normally positions it in the inactive position. On its higher order side this hook has an ear 405 which cooperates with a pin 406 on the hook 392 in the next higher order and all of the hooks in the higher orders are similarly provided with ears 405 on their higher order side, and pins 406 on their lower order side. As a result, in the normal position of the parts the spring 404 holds not only the hook 392 in the third order in its inactive position, but also all other higher order hooks because of the engagement of the ears 405 with the pins 406. Associated with each of the pins 406 is one arm of a bellcrank 407. These bellcranks are rotatably mounted on a shaft 408, and the other arm of each bellcrank is connected by a spring 409 with a pin 410 on the associated gear sector 351. In the normal position of the parts, counter-clockwise rotation (Fig. 12) of these bellcranks 407 under the influence of their springs is prevented by pins 411 on the gear sectors 351. Setting of the first significant figure causes rotation of the gear sector 351 in that order and removal of the pin 411, permitting the spring 409 to rotate the bellcrank 407 which, in engaging the pin 406, moves the associated hammer 392 and all lower order hammers into active position. In this manner printing of ciphers to the left of the first significant figure is avoided.

In order to print a symbol to identify the character of the operation, a type bar 420 (Figs. 14 and 16) is provided bearing the plus, minus and asterisk signs. The lever 130 (Figs. 11 and 14) which is set to the add, subtract and total positions has a pin 421 engaging in a V slot 422 in an arm 423 secured to a shaft 424. Also secured to the shaft 424 (Fig. 14) is an arm 425 having three recesses 426, 427, 428 into which a pin 430 on the type bar 420 enters when the type bar is set. The type bar has integral therewith a rack 431 engaging a gear segment 432 integral with a gear segment 433 which has a spring 434 attached thereto. When the gear segment 433 is released for movement, the spring 434 rotates it clockwise, moving the type bar 420 rearwardly until the pin 430 seats in one of the recesses 426, 427, 428 which serves to position the symbol.

In order to identify the totalizer, a type bar 435 (Fig. 16) is provided having type from 1 to 9. Type bar 435 is urged rearwardly in the same manner as the type bar 420 and has a pin 436 thereon which engages one of the series of steps 437 (Fig. 11) in a plate 438 secured to the shaft 305. Shaft 305 (Fig. 10) has an arm 440 thereon to which is secured a spring 441 which urges the shaft 305 clockwise in Fig. 10, or counter-clockwise in Fig. 2. Disposed beneath each rod 198 in each totalizer framework is a cam arm 442 secured to the shaft 305. The cam arms 442 are so arranged that the shaft 305 will be rotated different amounts for different totalizers so that the plate 438 is angularly displaced a different amount for each totalizer thereby serving to differentially stop the pin 436 and position the identifying numeral of the totalizer in the printing line.

I claim:

1. In a business machine, a plurality of item totalizers, a grand totalizer, a registration control means including a single series of ordinally arranged value selecting mechanisms, a keyboard for setting a value in said value selecting mechanisms, a cyclically operable actuating means, registration transmission mechanism normally operatively disconnected from said totalizers but being adapted to be selectively operatively connected thereto for transmitting the value from said registration control means to said grand totalizer and to a selected one of said item totalizers, a series of keys, one for each of said totalizers for selecting the one of said item totalizers to which the value is to be transmitted by said transmission mechanism, means associated with each of said keys and operative upon depression thereof for moving the selected item totalizer to connect it to said transmission mechanism and for initiating operation of said actuating means, means rendered operable by said actuating means for maintaining said actuating means in operation for two cycles, and means operated by said actuating means at the conclusion of the first of said two cycles of said actuating means for moving said item totalizer to disconnect it from said transmission mechanism and for moving said grand totalizer to connect it to said transmission mechanism.

2. In a business machine, a plurality of item totalizers, a grand totalizer, a registration control means including a single series of ordinally arranged value selecting mechanisms, a keyboard for setting a value in said value selecting mechanisms, a registration sign control means, a cyclically operable actuating means, registration transmission mechanism normally operatively disconnected from said totalizers but being adapted to be selectively operatively connected thereto for transmitting the value from said registration control means to said grand totalizer and to a selected one of said item totalizers, said totalizers being normally in non-registering position in which they are disconnected from said transmission mechanism, a series of keys, one for each of said totalizers, for selecting the one of said item totalizers to which the value is to be transmitted by said transmission mechanism, means operated by depression of one of the item totalizer selection keys for moving the selected associated item totalizer to registering position in which it is connected to said transmission mechanism and for initiating operation of said actuating means, means rendered operable by said actuating means for maintaining said actuating means in operation for two cycles, means operated by said actuating means at the conclusion of the first of said two cycles of said actuating means for moving said selected item totalizer to non-registering position, means normally operable by said actuating means for moving said grand totalizer to registering position at the conclusion of said first actuating means cycle for enabling registration of said value in said grand totalizer during the second of said two actuating means cycles, a device settable for total taking operations, means set thereby for adjusting said sign control means for subtractive registration in the selected item totalizer when one of said item totalizer selection keys is depressed, and means operable by setting of said device for a total taking operation for disabling said means for moving said grand totalizer to registering position to thereby prevent entry of a value in said grand totalizer being effected by depression of said item totalizer selection key.

3. In a business machine, a plurality of item totalizers, a grand totalizer, a registration control means including a single series of ordinally arranged value selecting mechanisms, a keyboard for setting a value in said value selecting mechanisms, a registration sign control means, a cyclically operable actuating means, registration transmission mechanism normally operatively disconnected from said totalizers but being adapted to be selectively operatively connected thereto for transmitting the value from said registration control means to said grand totalizer and to a selected one of said item totalizers, said totalizers being normally in non-registering position in which they are disconnected from said transmission mechanism, a series of keys, one for each of said item totalizers, for selecting the one of said item totalizers to which the value is to be transmitted by said transmission mechanism, means operated by depression of one of the item totalizer selection keys for moving the selected associated item totalizer to registering position in which it is connected to said transmission mechansm and for initiating operation of said actuating means, means rendered operable by said actuating means for maintaining said actuating means in operation for two cycles, means operated by said actuating means at the conclusion of the first of said two cycles of said actuating means for moving said selected item totalizer to non-registering position, means normally operable by said actuating means for moving said grand totalizer to registering position at the conclusion of said first actuating means cycle for enabling registration of said value in said grand totalizer during the second of said two actuating means cycles, a device settable for total taking operations, means set thereby for adjusting said sign control means for subtractive registration in the selected item totalizer when one of said item totalizer selection keys is depressed, means operable by setting of said device for a total taking operation for disabling said means for moving said grand totalizer to registering position to thereby prevent entry of a value in said grand totalizer being effected by depression of said item totalizer selection key, a grand totalizer key operable for reenabling said means for moving said grand totalizer to registering position, means normally preventing operation of said grand totalizer key, and means operable by said device when it is set for total taking for disabling said operation preventing means so as to permit operation of said grand totalizer key.

4. In a business machine, a plurality of item totalizers, a grand totalizer, a registration control means including a single series of ordinally arranged value selecting mechanism, a keyboard for setting a value in said value selecting mechanisms, a cyclically operable actuating means, registration transmission mechanism normally operatively disconnected from said totalizers but being adapted to be selectively operatively connected thereto for transmitting the value additively or subtractively from said registration control means to said grand totalizer and to a selected one of said item totalizers, a selector key for enabling the one of said item totalizers into which the value is to be transmitted by said transmission mechanism and for initiating operation of said actuating means, means actuatable in response to an operation of said key for maintaining said actuating means in operation for two cycles, means actuatable in response to said operation of said key for effecting operative connection of said transmission mechanism to the selected item totalizer during the first only of said two cycles, means operable by said actuating means at the end of said first cycle for disconnecting said transmission mechanism from said selected item totalizer, and means operable by said actuating means after said first cycle thereof for effecting operative connection of said transmission mechanism to said grand totalizer during the second of said two cycles.

5. In a business machine, a plurality of item totalizers, a grand totalizer, a registration control means including a single series of ordinally arranged value selecting mechanisms, a keyboard for setting a value in said value selecting mechanisms, a cyclically operable unidirectionally rotatable actuating means, registration transmission mechanism normally operatively disconnected from said totalizers but being adapted to be selectively operatively connected thereto for transmitting the value from said registration control means to said grand totalizer and to a selected one of said item totalizers, means for selecting the one of said item totalizers to which the value is to be transmitted by said transmission mechanism and for initiating operation of said actuating means, means actuatable in response to an operation of said selecting and initiating means for maintaining said actuating means in operation for two cycles, means actuatable in response to said operation of said selecting and initiating means for effecting operative connection of said transmission mechanism to the selected item totalizer during the first only of said two cycles, means including a cam and follower operable by said actuating means at the end of said first cycle for disconnecting said transmission mechanism from said selected item totalizer, and means including a cam and follower operable by said actuating means after said first cycle thereof for effecting operative connection of said transmission mechanism to said grand totalizer during the second of said two cycles.

6. In a business machine, a plurality of item totalizers; a grand totalizer; a registration control means including a single series of ordinally arranged value selecting mechanisms; a keyboard for setting a value in said value selecting mechanisms; a cyclically operable actuating means; registration transmission mechanism normally operatively disconnected from said totalizers but being adapted to be selectively operatively connected thereto for transmitting the value from said registration control means to said grand totalizer and to a selected one of said item totalizers; a single transfer mechanism comprising a series of ordinally arranged tens transfer devices operable by said actuating means; a selective member for selecting the one of said item totalizers to which the value is to be transmitted by said transmission mechanism and for initiating operation of said actuating means; means actuatable in response to an operation of said selective member for maintaining said actuating means in operation for a predetermined period; means actuatable in response to operation of said selective member for effecting operative connection of said transmission mechanism to the selected item totalizer during one part of said predetermined period; means operable in response to entry of a value in said selected item totalizer requiring a transfer operation therein for effecting operative connection by said transfer mechanism of one of said transfer devices to said registration transmission mechanism during a later portion of said part of said predetermined period to thereby effect transmission of transfer drive from said actuating means to said selected item totalizer; means for effecting operative connection of said transmission mechanism to said grand totalizer during another part of said predetermined period; and means operable in response to entry of a value in said grand totalizer requiring a tens transfer operation therein for effecting operative connection by said transfer mechanism of one of said transfer devices to said registration transmission mechanism during a later portion of said other part of said predetermined period to thereby effect transmission of transfer drive from said actuating means to said grand totalizer.

7. In a business machine, a plurality of item totalizers; a grand totalizer; a registration control means including a single series of ordinally arranged value selecting mechanisms; a keyboard for setting a value in said value selecting mechanisms; a cyclically operable unidirectional rotatable actuating means; registration transmission mechanism normally operatively disconnected from said totalizers but being adapted to be selectively operatively connected thereto for transmitting the value from said registration control means to said grand totalizer and to a selected one of said item totalizers; a single transfer mechanism comprising a series of ordinally arranged tens transfer devices operable by said actuating means; a manipulatable member for selecting the one of said item totalizers to which the value is to be transmitted by said transmission mechanism and for initiating operation of said actuating means; means actuatable in response to manipulation of said member for maintaining said actuating means in operation for two complete cycles; means actuatable in response to operation of said manipulatable member for effecting operative connection of said transmission mechanism to the selected item totalizer during the first of said two cycles; means operable in response to entry of a value in said selected item totalizer requiring a transfer operation therein for effecting operative connection by said transfer mechanism of one of said transfer devices to said registration transmission mechanism during a later portion of the first of said two cycles to thereby effect transmission of transfer drive from said actuating means to said selected item totalizer; means for effecting operative connection of said transmission mechanism to said grand totalizer during the second of said two cycles; and means operable in response to entry of a value in said grand totalizer requiring a tens transfer operation therein for effecting operative connection by said transfer mechanism of one of said transfer devices to said registration transmission mechanism during a later portion of the second of said two cycles to thereby effect transmission of transfer drive from said actuating means to said grand totalizer.

GRANT C. ELLERBECK.

References Cited in the file of this patent

UNITED STATES PATENTS

| Number | Name | Date |
|---|---|---|
| 1,340,827 | Hayes et al. | May 18, 1920 |
| 1,950,480 | Carroll | Mar. 13, 1934 |
| 2,165,340 | Butler | July 11, 1939 |
| 2,226,960 | Anderson | Dec. 31, 1940 |
| 2,229,762 | Muller | Jan. 28, 1941 |
| 2,277,250 | Nyberg | Mar. 24, 1942 |
| 2,308,940 | Sundstrand | Jan. 19, 1943 |